F. MÜNZINGER.
APPARATUS FOR REMOVING GASES FROM AND PURIFYING LIQUIDS.
APPLICATION FILED NOV. 14, 1914.
1,180,786.
Patented Apr. 25, 1916.
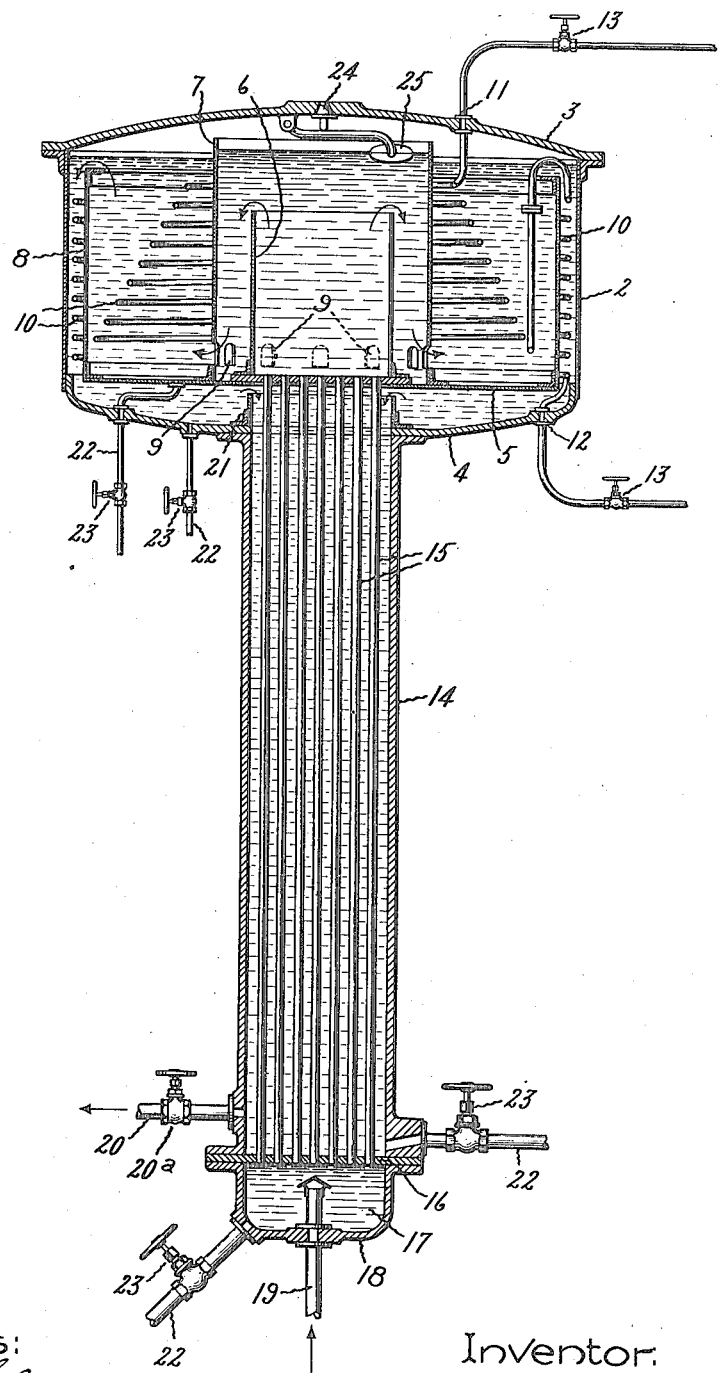
Witnesses:
Inventor:
Friedrich Münzinger,
by: His Attorney.

UNITED STATES PATENT OFFICE.

FRIEDRICH MÜNZINGER, OF BERLIN, GERMANY, ASSIGNOR TO GENERAL ELECTRIC COMPANY, A CORPORATION OF NEW YORK.

APPARATUS FOR REMOVING GASES FROM AND PURIFYING LIQUIDS.

1,180,786.

Specification of Letters Patent.

Patented Apr. 25, 1916.

Application filed November 14, 1914. Serial No. 872,222.

*To all whom it may concern:*

Be it known that I, FRIEDRICH MÜNZINGER, a subject of the King of Wurttemberg, residing at Berlin, Germany, have invented certain new and useful Improvements in Apparatus for Removing Gases from and Purifying Liquids, of which the following is a specification.

The present invention relates to apparatus for removing gases from and purifying liquids by heating and has for its object to provide an improved arrangement for this purpose.

It is well known that gases, as well as some solids, held in solution or suspension in liquids may be removed to a greater or less extent by heating, the degree of temperature required depending upon the particular case.

The present invention relates more specifically to an apparatus which will require the expenditure of a minimum amount of heat.

In carrying out my invention I provide a casing or receptacle having suitable walls arranged therein to form a plurality of chambers through which the liquid to be heated flows. These walls are so arranged that the liquid will follow a circuitous path flowing up and down between them. This gives the gases ample opportunity to escape. Arranged between some or all of the walls are suitable heating coils. This casing or receptacle with the heating coils therein comprise a heater or heating device or means. The circuitous path of the liquid brings all the liquid into contact with the heating coils so as to quickly and evenly heat the same.

My apparatus is primarily designed for use where it is unnecessary or even objectionable to have the liquid retain the heat imparted to it after the gases have been separated, and one of the features of my invention is the provision in connection with the heater of means whereby the heat of the water flowing from the apparatus is imparted to that flowing into it. To this end I arrange the inlet and outlet conduits for the liquids in heat exchanging relation to each other. I preferably use an arrangement in the nature of a surface condenser which comprises a plurality of tubes surrounded by a casing, the liquid flowing through the tubes in one instance and through the casing and around the tubes in the other. By this means substantially all the heat of the liquid flowing from the heater is imparted to that flowing to it. The heater or heating coils are, therefore, required to furnish only so much heat as is lost by radiation.

Referring to the drawing, which is a sectional view of one form or embodiment of my invention, 2 indicates the side wall of a casing or receptacle, and 3 and 4 the top and bottom walls. This casing or receptacle forms the heater. Suitably arranged inside the casing is a base plate 5 which supports the walls 6, 7 and 8, which coöperate with each other and with the casing to form a plurality of concentric chambers. Adjacent the lower end of the wall 7 are arranged openings 9. Inside the casing and suitably distributed between the walls are the heating coils 10, the same entering through the top of the casing at 11 and passing out through the bottom at 12. Suitable valves 13 are provided to control the passage of heating fluid through the coils.

14 indicates a conduit or casing which communicates with an opening in the bottom wall 5 and within which are arranged a plurality of tubes 15. These tubes at their upper end pass through the base plate 5 and communicate with the chamber defined by the wall 6. The lower ends of the tubes pass through a plate 16 which closes the lower end of the conduit 14 and communicate with a chamber 17 formed by the cap 18. The fluid to be heated flows in through the pipe 19 to the chamber 17 and thence through the tubes 15 to the space within the wall 6. From here the fluid flows over the upper edge of the wall 6 down between the walls 6 and 7 through the openings 9 up between walls 7 and 8 over the upper edge of wall 8, down between wall 8 and the side wall 2 and from there into the conduit 14 and out by way of pipe 20. Arranged in the pipe 20 is a controlling valve 20ª for regulating the flow of fluid from the conduit 14. The fluid in passing over the coils 10 will be heated to the desired temperature and when flowing down through the conduit 14 which surrounds the pipes 15, the heat of the fluid will be imparted to that flowing in through these pipes so that the temperature of the fluid flowing from pipe 20 will be substantially the same as that entering the pipe 19.

Projecting upward from the bottom 4 and surrounding the tubes 15 is a flange or collar 21. This serves to restrict to some extent the flow through the conduit 14 so as to distribute it more evenly over the pipes 15. It also acts to retain sediment or impurities which may separate out from the liquid. At 22 are shown drain pipes having suitable valves 23 therein for draining out the sediment which may settle in the bottom of the various parts of the apparatus. A suitable valve is provided to permit of the escape from the casing of the gases which separate from the liquid. An automatic valve is preferable. In the present instance a valve 24 is shown arranged in the top of the casing, which valve is controlled by a float 25. When the pressure of the gases trapped in the casing above the liquid therein reaches a predetermined value, the level of the liquid will be lowered to such an extent that the float 25 will fall away from the stem of valve 24 and will permit the valve to open by gravity. The gases can then escape until the pressure decreases to such a point that the liquid rises in the casing and closes the valve.

The apparatus as described may be used for various purposes. The specific arrangement illustrated has been designed particularly for use in removing gases and impurities from boiler feed water. It is well known that much of the corrosion which occurs in boilers, economizers, and similar apparatus, is due to the presence of gases in the feed water. When used for this purpose the apparatus may be placed either upon the suction side of the feed water pump, or between the pump and the economizer as found desirable. In such a case the exhaust steam from the pump may, with advantage, be used in the heating coils. My apparatus would also be useful as a re-boiler in the manufacture of artificial ice, it being understood that the object of the re-boiler is for removing all gases from the water, and such solid impurities as will be precipitated by boiling, so as to be able to make crystal ice.

When first starting it will of course be necessary to provide sufficient heat in the coils to heat the liquid from its initial temperature. After the apparatus is in operation the incoming liquid will be primarily heated by the outflowing and the heating coil will be then required to furnish only a small amount of heat. This is a very economical arrangement.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an apparatus of the character described, the combination of a casing, concentrically arranged steam heating coils therein, a conduit for conveying liquid to the casing, means in the casing for directing the liquid in reversely directed paths over the coils, and a conduit for conveying the liquid from the casing, said conduits being arranged in heat exchanging relation.

2. In an apparatus of the character described, the combination of a casing, a plurality of concentrically arranged walls therein forming chambers, heating coils disposed in some of said chambers, and conduit means arranged in heat exchanging relation for conveying liquid to and from the casing, said conduit means communicating with the innermost and outermost chambers respectively.

3. In an apparatus of the character described, the combination of a casing, a plurality of concentrically arranged walls therein forming chambers, heating coils disposed in some of said chambers, conduit means arranged in heat exchanging relation for conveying liquid to and from the casing, said conduit means communicating with the innermost and outermost chamber respectively, and an automatic valve for controlling the escape of gases from the casing.

4. In an apparatus of the character described, the combination of a casing, a plurality of concentrically arranged walls therein forming chambers, heating coils disposed in some of said chambers, a heat exchanging means comprising a plurality of tubes, and a conduit surrounding the same, said tubes and conduit communicating with the innermost and outermost chambers, and pipes for conveying fluid to and from the heat exchanging means.

In witness whereof, I have hereunto set my hand this 17 day of October, 1914.

FRIEDRICH MÜNZINGER.

Witnesses:
WOLDEMAR HAUPT,
HENRY HASPER.